(12) United States Patent
Bruehne et al.

(10) Patent No.: US 10,690,271 B2
(45) Date of Patent: Jun. 23, 2020

(54) TRANSFER HOSE, IN PARTICULAR FOR USE AT HIGH TEMPERATURES

(71) Applicant: ContiTech Schlauch GmbH, Hannover (DE)

(72) Inventors: Klaus Bruehne, Korbach (DE); Klaus Schmelter, Brilon (DE); Metin Tasseki, Korbach (DE); Rainer Lange, Frankenau (DE)

(73) Assignee: ContiTech Schlauch GmbH, Hannover (DE)

( * ) Notice: Subject to any disclaimer, the term of this patent is extended or adjusted under 35 U.S.C. 154(b) by 918 days.

(21) Appl. No.: 14/609,179

(22) Filed: Jan. 29, 2015

(65) Prior Publication Data

US 2015/0144219 A1 May 28, 2015

Related U.S. Application Data

(63) Continuation of application No. PCT/EP2013/064107, filed on Jul. 4, 2013.

(30) Foreign Application Priority Data

Aug. 2, 2012 (DE) .......... 10 2012 107 095

(51) Int. Cl.
*F16L 11/04* (2006.01)
*B32B 1/08* (2006.01)
(Continued)

(52) U.S. Cl.
CPC .............. *F16L 11/04* (2013.01); *B32B 1/08* (2013.01); *B32B 25/10* (2013.01); *B32B 25/14* (2013.01);
(Continued)

(58) Field of Classification Search
CPC ........ F16L 11/04; F16L 11/088; F16L 11/125; F16L 11/086; B32B 25/14; B32B 25/10;
(Continued)

(56) References Cited

U.S. PATENT DOCUMENTS 3,068,636 A * 12/1962 Masurel ................ D02G 3/367
57/227
4,693,726 A 9/1987 Meininger et al.
(Continued)

FOREIGN PATENT DOCUMENTS

DE 10334443 B3 2/2005
DE 10334673 B3 2/2005
(Continued)

OTHER PUBLICATIONS

Eriks (Eriks, "Fluorocarbon rubber / FKM/ FPM," Rubber Technology Info., 2019, p. 1-3, https://rubbertechnology.info/en/-rubber-compounds/fluorocarbon-rubber--fkmfpm/, accessed Jun. 18, 2019).*
(Continued)

*Primary Examiner* — Gerard Higgins
*Assistant Examiner* — Kevin C Ortman, Jr.
(74) *Attorney, Agent, or Firm* — David L. Cate; Gregory Adams

(57) ABSTRACT

A transfer hose is configured having multiple layers and contains at least one inner layer and one transfer layer, wherein the transfer layer is structured from at least 20 wt % of polyphenylensulfide (PPS) and/or polyoxadiazole (POD) and/or aramide (AR) and/or polyimide (PI) and/or polyether ether ketone (PEEK) and/or polyethylene-2,6-naphthalate (PEN) and/or polyphenylene (PPP) and/or polyphenylenoxide (PPO) and/or polyphenylensulfide (PPS) and/or polyphenylenether (PPE) and/or polybenzoxazole (PBO) and/or carbon fibers (CF) and/or metal fibers (MF). The hose-shaped article is in particular a turbocharger hose.

9 Claims, 3 Drawing Sheets

(51) Int. Cl.
    *F16L 11/12* (2006.01)
    *F16L 11/08* (2006.01)
    *B32B 25/14* (2006.01)
    *B32B 25/10* (2006.01)

(52) U.S. Cl.
    CPC ........... *F16L 11/086* (2013.01); *F16L 11/088* (2013.01); *F16L 11/125* (2013.01); *B32B 2262/02* (2013.01); *B32B 2262/0269* (2013.01); *B32B 2262/0276* (2013.01); *B32B 2262/103* (2013.01); *B32B 2262/106* (2013.01); *B32B 2597/00* (2013.01)

(58) Field of Classification Search
    CPC ............... B32B 1/08; B32B 2262/02; B32B 2262/0269; B32B 2262/0276; B32B 2262/103; B32B 2262/106; B32B 2597/00
    USPC ... 428/116, 131, 159, 196, 36.9, 36.91, 408, 428/14.8, 76
    See application file for complete search history.

(56) References Cited

U.S. PATENT DOCUMENTS

| | | | |
|---|---|---|---|
| 6,161,592 A * | 12/2000 | Yamamoto | F16L 11/081 138/126 |
| 6,302,150 B1 | 10/2001 | Martucci et al. | |
| 7,086,420 B2 | 8/2006 | Kahn et al. | |
| 9,140,390 B2 | 9/2015 | Brettshneider | |
| 2004/0134555 A1* | 7/2004 | Powell | B32B 1/08 138/141 |
| 2007/0218233 A1* | 9/2007 | Duke | F16L 11/04 428/36.91 |
| 2008/0202619 A1* | 8/2008 | Hirai | F16L 11/081 138/126 |
| 2009/0130357 A1 | 5/2009 | Seyler | |
| 2009/0320952 A1* | 12/2009 | Amma | B32B 1/08 138/126 |
| 2012/0145275 A1 | 6/2012 | Seebold et al. | |

FOREIGN PATENT DOCUMENTS

| | | | | |
|---|---|---|---|---|
| DE | 102009051503 A1 | 5/2011 | | |
| EP | 0202436 A2 | 11/1986 | | |
| EP | 1568484 A1 * | 8/2001 | ............... | B32B 1/08 |
| EP | 1754919 A1 | 2/2007 | | |
| EP | 2422966 A1 | 2/2012 | | |
| WO | WO 2011012374 A1 * | 2/2011 | ............... | B32B 1/08 |

OTHER PUBLICATIONS

International Search Report dated Oct. 8, 2014 of international application PCT/EP2013/064107 on which this application is based.
Roempp Online Chemistry Encyclopedia, "Spinnfaser", edited by Wolfgang Tuerk, version 3.14, Georg Thieme Verlag KG, May 2005, https://roempp.thieme.de/roempp4.0/do/data/RD-19-03364, one page and translation into English.
ASCO, Product Information, p. 21, first column.

* cited by examiner

TRANSFER HOSE, IN PARTICULAR FOR USE AT HIGH TEMPERATURES

CROSS REFERENCE TO RELATED APPLICATIONS

This application is a continuation application of international patent application PCT/EP2013/064107, filed Jul. 4, 2013, designating the United States and claiming priority from German application 10 2012 107 095.4, filed Aug. 2, 2012, and the entire content of both applications is incorporated herein by reference.

FIELD OF THE INVENTION

The invention relates to a mantle hose that is particularly useful for high temperature applications.

BACKGROUND OF THE INVENTION

Mantle hoses are flexible hoses that are furnished with an outer ply of reinforcing elements, the so-called "mantle". Inside the surrounding outer ply, hoses of such kind may comprise a plurality of plies or layers made of various elastomers, thermoplastic elastomers or thermoplastics and reinforcing elements. The outer ply of reinforcing elements may have the form of a braided, knitted, meshed or woven structure or the like.

Textile mantle hoses are frequently used in the low pressure range and/or the low temperature range (<150° C.), as fuel, oil or compressor hoses, for example. Hoses with reinforcing inserts have been used regularly for the high temperature range (≤150° C.) previously, but the high-quality, additional outer layer they need in order to function effectively represents a significant disadvantage in terms of both cost and weight.

Mantle hoses for high temperature applications with a thermoplastic base may be constructed inter alia as polytetrafluoroethylene (PTFE) pipes, or even as corrugated PTFE pipes (Teflon® corrugated pipes) surrounded by an additional stainless steel braid. The disadvantage with this arrangement is that such hoses are heavier, very stiff and inflexible, and have low dynamic performance capabilities in motion.

Mantle hoses are also known in which the mantle is constructed from glass fibers, and these are used in particular in the low pressure range. However, one disadvantage of glass fibers is that they become increasingly susceptible to hydrolysis as the temperature rises. Furthermore, special personal protection measures must be taken when processing glass fibers, and this substantially raises the level of complexity in production.

SUMMARY OF THE INVENTION

In the nature of a further development, the object of the invention is therefore to provide a mantle hose having good dynamic service life performance even with substantial movement, and particularly at high temperatures (≥150° C.). At the same time, the mantle hose should be more flexible, weigh less, have small minimum bending radii and above all be resistant to corrosion and hydrolysis.

This object is achieved in that the mantle of the mantle hose is constructed from at least 20% by weight polyphenylene sulfide (PPS) and/or polyoxadiazole (POD) and/or aramid (AR) and/or polyimide (PI) and/or polyetheretherketone (PEEK) and/or polyethylene-2,6-naphthalate (PEN) and/or polyphenylene (PPP) and/or polyphenylene oxide (PPO) and/or polyphenylene sulfide (PPS) and/or polyphenylene ether (PPE) and/or polybenzoxazole (PBO) and/or carbon fibers (CF) and/or metal fibers (MF).

Surprisingly, it has been found that a mantle hose in which at least 20% by weight of the mantle thereof is constructed from the materials listed above, either alone or in combinations thereof, has a particularly high dynamic service life performance even with substantial movement at high temperatures (≥150° C.). The materials listed are preferably used in combination with elastomers, thermoplastic elastomers and/or thermoplastics that have a thermal resistance greater than or equal to 150° C.

Such a mantle hose is used preferably in turbocharger lubrication, turbocharger cooling, compressors, fuel systems, diesel particulate filters (DPF), transmission and engine cooling, or in applications in which aggressive media must be transported at high temperatures. The mantle hose according to the invention is therefore particularly suitable for temperatures equal to or above 150° C.

In this context, the mantle hose may also be used in a straight or shaped design, as an elbow, for example.

As was noted in the introduction, such hoses may contain a plurality of plies or layers of different elastomers, thermoplastic elastomers or thermoplastics. Equally, one or more embedded reinforcing element plies may be present as well as the mantle. For this purpose, all reinforcing element materials known to a person skilled in the art may be used.

In general, all elastomers, thermoplastic elastomers or thermoplastics may be used according to the invention. Preferred are elastomers, thermoplastic elastomers or thermoplastics that are thermally resistant to temperatures equal to 150° C. or higher.

Elastomers are selected for example from the group consisting of: (partially) hydrogenated nitrile rubber (HNBR) and/or fluoro rubber (FKM) and/or polyepichlorohydrin (ECO) and/or ethylene-vinyl acetate rubber (EVA) and/or acrylate rubber (ACM) and/or ethylene-acrylate rubber (AEM) and/or silicone rubber (MQ, VMQ, PVMQ, FVMQ) and/or fluorinated methyl silicone rubber (MFQ) and/or perfluorinated propylene rubber (FFPM) and/or perfluorocarbon rubber (FFKM) and/or ethylene-propylene-diene rubber (EPDM).

Particularly good results in terms of the dynamic stability at high temperatures can be achieved when HNBR, FKM, FFPM, ACM, AEM and/or silicone rubber is used, FKM, FFPM and AEM being particularly well suited.

The elastomers mentioned may be used alone or blended with at least two elastomers.

It is also possible to use elastomers blended with thermoplastic elastomers and/or thermoplastics.

Preferably, at least one thermoplastic elastomer having a polycarbonate component (TPE-C) is used as the thermoplastic elastomer.

According to the invention, polyphenylene sulfide (PPS) and/or polyoxadiazole (POD) and/or aramid (AR) and/or polyimide (PI) and/or polyetheretherketone (PEEK) and/or polyethylene-2,6-naphthalate (PEN) and/or polyphenylene (PPP) and/or polyphenylene oxide (PPO) and/or polyphenylene sulfide (PPS) and/or polyphenylene ether (PPE) and/or polybenzoxazole (PBO) and/or carbon fibers (CF) and/or metal fibers (MF) in quantities of at least 20% by weight are used as the reinforcing elements. In this context, PPS, POD and/or aramid, in particular m-aramid, are particularly preferred.

Meta-aramid (m-aramid) and para-aramid (p-aramid) may preferably be used as the aramid, and steel fibers, particularly stainless steel fibers, may preferably be used as the metal fibers.

According to the invention, at least 20% by weight, preferably at least 30% by weight, particularly preferably at least 50% by weight, most preferably at least 80% by weight of the mantle must be made from the materials mentioned, alone or in combination, for example as a hybrid or as a mixed braid. It is also possible for the mantle to be made up of 100% by weight of the materials mentioned, either alone or in combination.

In a particularly preferred embodiment, the mantle is free from glass fibers in order to avoid the disadvantages described previously.

Examples of such hybrid or mixed braid concepts are: PPS/m-aramid, PPS/PBO, PPS/POD, stainless steel/PPS.

In such cases, a mixed braid consists of at least two separate threads, which are intertwined, interwoven to form a woven fabric, knitted to form a knit, or processed as a nonwoven or felt.

In a hybrid, the filament consists of at least two different materials.

The reinforcing element material for the mantle is preferably present in the form of a filament, particularly a monofilament, staple fiber, continuous filament fiber, yarn or twine. Staple fibers are particularly suitable, because they usually produce enhanced physical ply adhesion compared to untreated filament yarns. According to the Römpp online chemistry encyclopedia, version 3.14, the term staple fiber is an old term for spun bonded fibers. Spun bonded fibers are "a fiber having limited length (as opposed to filaments), produced by chemical-technical processing in various methods, which is usually obtained as a flake and after a mechanical spinning process is usually spun into spun bonded yarn, or tow, or is processed to make felts, nonwoven fabrics, batting, filling and insulating material or similar products." This means that all staple fibers are single fibers, and are of limited length. Filaments are continuous fibers. The staple fibers generally have a length between 10 and 70 mm. The staple fibers may consist of one type of fiber or a combination of two or more different fibers.

Accordingly, the braid in a mixed braid can be made exclusively from continuous fibers, exclusively from staple fibers, or also from a combination of continuous and staple fibers. The use of a staple fiber construction enables greater surface coverage than with a filament fiber, and improved thermal protection by the insulating effect of the air trapped in the staple fiber construction. In the untreated state, the staple fibers demonstrate better physical adhesion to the inner layer or the intermediate layer. At the same time, this also offers the option of improved possible surface treatment of the staple fibers.

The total denier per filament is preferably from 500 to 10,000 dtex, particularly preferably from 900 to 3000 dtex. The twist level is preferably from 0 to 750 t/m, particularly preferably from 300 to 500 t/m.

The mantle hose according to the invention may also be equipped with a rigid reinforcing element, such as is known for example from U.S. Pat. No. 4,693,726 for hoses with an (elastomeric) covering layer. The rigid reinforcement preferably consists of monofilaments, also called monofils, which are wound in the same or opposite directions around and into the mantle. The monofilaments in this case may also be wound crosswise. The monofilaments may be constructed from a metallic material, such as stainless steel, or a non-metallic material, such as PPS or POD. This means that the material of the rigid reinforcing element may be the same as or different from the material of the mantle.

The mantle is applied as a textile fabric in the form of a braid, cord, knitted, meshed, woven, nonwoven or crossply structure, the preferred application being in the form of a braid. The mantle layer in this case may consist of a single ply or multiple plies. The mantle layer preferably comprises from 1 to 5 plies, particularly preferably 1 to 3 plies, and most preferably 1 to 2 plies.

It may be possible to apply a protective layer to the mantle, that is to say the outer reinforcing elements, which layer would protect the fibers from external influences such as mechanical or chemical damage.

Some or all of the reinforcing elements may also be dyed, for example by spin-dyeing, cheese dyeing or rope dyeing. Among other advantages, this is used to apply a visible marking. Subsequent surface functionalization such as with RFL or fluoropolymer solutions, optionally in combination with a dye, is also possible. This mantle protection not only serves as protection from cutting, which prevents fraying of the interface, but also improves adhesion between the fibers and the inner layer, the visual identification option, the appearance and the resistance to soiling.

Particularly good dynamic stability at high temperatures is achievable with the following combinations of elastomer and reinforcing elements:

AEM/PPS→150° C. continuous stability, 175° C. peak
FKM/PPS→190° C. continuous stability, 210° C. peak
FKM/POD→210° C. continuous stability, 230° C. peak
FKM/m-aramid→230° C. continuous stability, 250° C. peak

DESCRIPTION OF THE PREFERRED EMBODIMENTS OF THE INVENTION

The invention will now be explained using an exemplary embodiment, with reference to experimental results and schematic drawings.

Experimental Results

A mantle hose having an inner layer of FPM and a mantle of PPS staple fibers showed no loss of strength after undergoing heat aging in a convection oven at 190° C. for 7 days. In this case, deterioration was determined by establishing the bursting pressure in new hoses compared to aged hoses. After 42 days, a loss of strength of just 15% was observed.

A comparative mantle hose having an inner layer of FPM and a mantle of polyester (PES) fibers showed a loss of strength of over 30% after undergoing heat aging in a convection oven at 190° C. for 7 days. After 42 days a loss of strength of over 40% resulted, which is not acceptable in hose structures that are designed to last as long as the service life of a motor vehicle.

After undergoing heat aging in a convection oven at 150° C. for 7 days, a comparative mantle hose having an inner layer of NBR and a mantle of Modal (CMD) fibers became so hard that it could not be used for further testing because it broke apart upon bending.

BRIEF DESCRIPTION OF THE DRAWINGS

The invention will now be described with reference to the drawings wherein.

Figure 1:
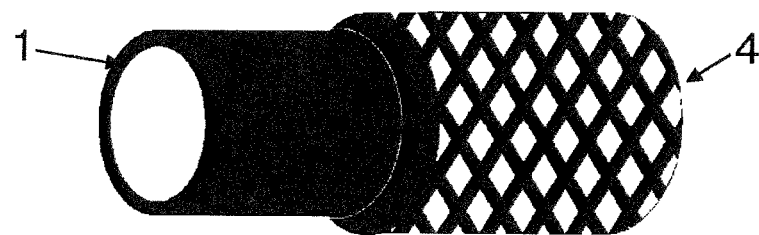
FIG. 1 shows a mantle hose constructed from: inner layer 1, mantle 4.
Figure 2:
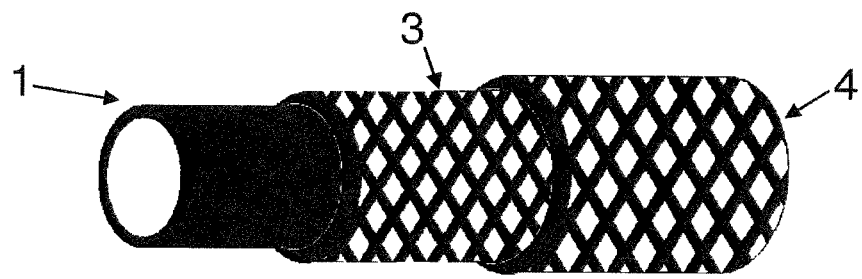
FIG. 2 shows a mantle hose constructed from: inner layer 1, embedded reinforcing element ply 3, mantle 4.
Figure 3:
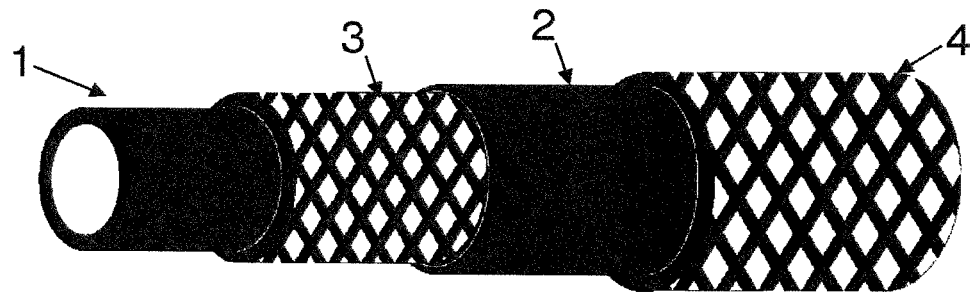
FIG. 3 shows a mantle hose constructed from: inner layer 1, embedded reinforcing element ply 3, intermediate layer 2, mantle 4.
Figure 4:
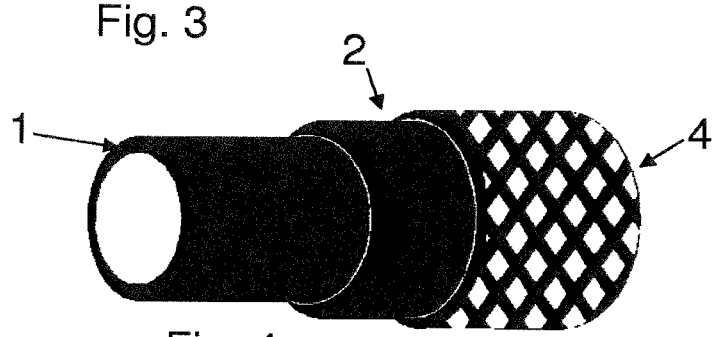
FIG. 4 shows a mantle hose constructed from: inner layer 1, intermediate layer 2, mantle 4.
Figure 5:
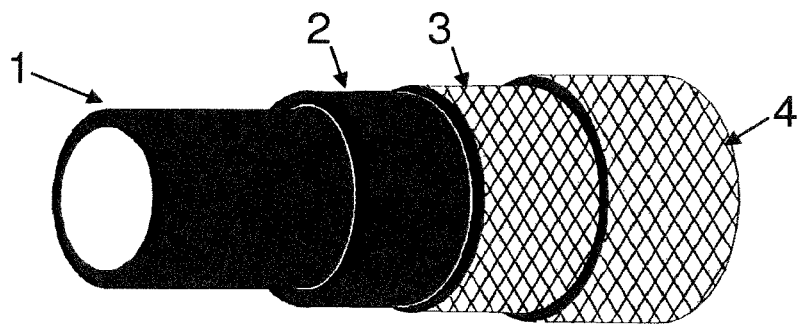
FIG. 5 shows a mantle hose constructed from: inner layer 1, intermediate layer 2, embedded reinforcing element ply 3, mantle 4.
Figure 6:
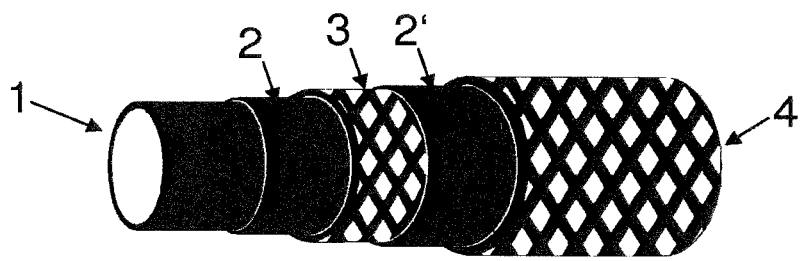
FIG. 6 shows a mantle hose constructed from: inner layer 1, intermediate layer 2, embedded reinforcing element ply 3, intermediate layer 2', mantle 4.
Figure 7:
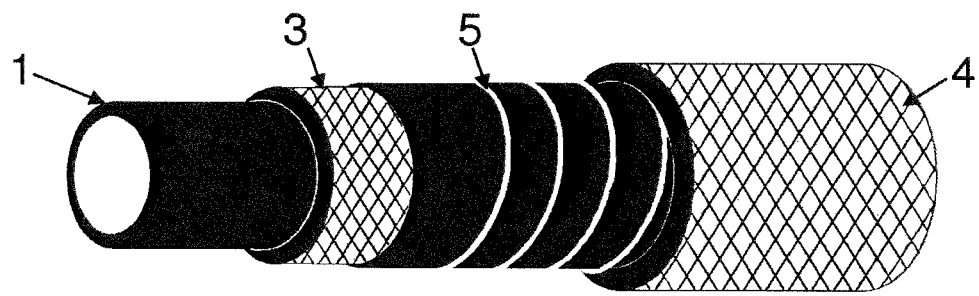
FIG. 7 shows a mantle hose constructed from: inner layer 1, embedded reinforcing element ply 3, helix 5, mantle 4. Helix 5 may also be embedded in an elastomeric matrix. As an alternative to introducing helix 5 between two reinforcing plies (3, 3'), a monofil reinforcing element may be used in order to improve bending sensitivity and at the same time increase partial vacuum stability (see also FIG. 9 and FIG. 10)
Figure 8:
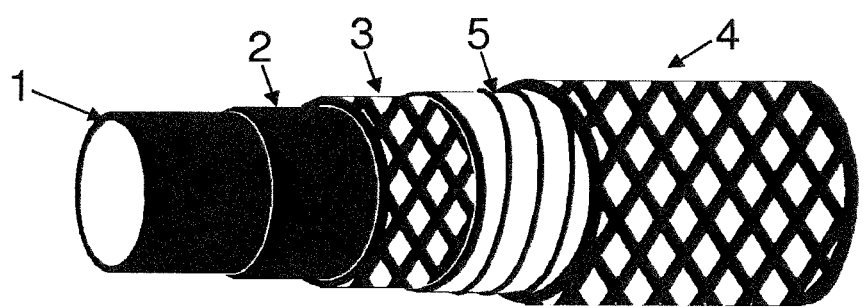
FIG. 8 shows a mantle hose constructed from: inner layer 1, intermediate layer 2, embedded reinforcing element ply 3, helix 5, mantle 4. Helix 5 may also be embedded in an elastomeric matrix. As an alternative to introducing helix 5 between two reinforcing plies (3, 3'), a monofil reinforcing element may be used in order to improve bending sensitivity and at the same time increase partial vacuum stability (see also FIG. 9 and FIG. 10)
Figure 9:
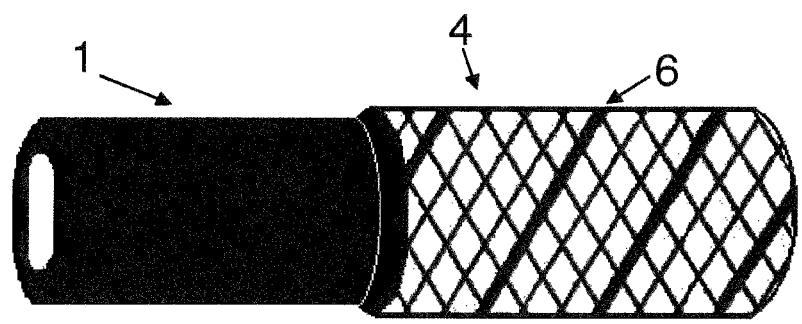
FIG. 9 shows a mantle hose constructed from: inner layer 1 and mantle 4. In this case, mantle 4 is also equipped with integrated monofilaments (heavy lines) as rigid reinforcing element 6, as is known from U.S. Pat. No. 4,693,726; and, FIG. 10 shows a mantle hose constructed from: inner layer 1 and mantle 4. In this case, mantle 4 is also equipped with integrated transversely wound monofilaments (heavy lines) as rigid reinforcing element 6, as is known from U.S. Pat. No. 4,693,726.
Figure 10:
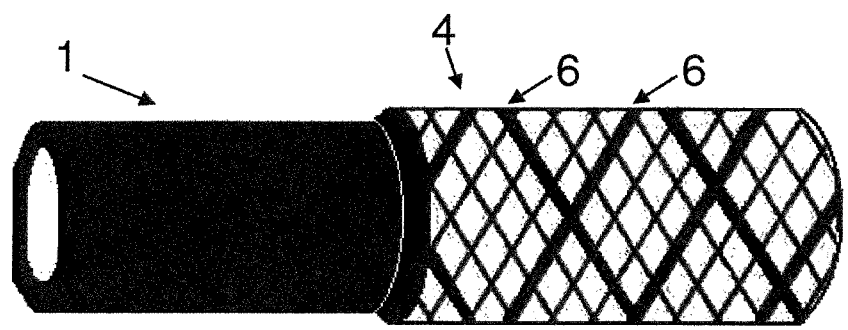

It is understood that the foregoing description is that of the preferred embodiments of the invention and that various changes and modifications may be made thereto without departing from the spirit and scope of the invention as defined in the appended claims.

LIST OF REFERENCE NUMERALS (Part of the Description)
1 Inner layer
2, 2' Intermediate layer
3, 3' Embedded reinforcing element layer
4 Outer reinforcing element layer (mantle), one or more plies
5 Helix
6 Rigid reinforcing element (monofilaments)

What is claimed is:

1. A multi-layer mantle hose comprising:
   at least one inner layer; and,
   a mantle layer,
   wherein the at least one inner layer consists of FKM,
   wherein the mantle layer comprises at least 20% by weight polyphenylene sulfide (PPS), polyoxadiazole (POD), polyphenylene (PPP), polyphenylene oxide (PPO), polyphenylene ether (PPE), polybenzoxazole (PBO), carbon fibers (CF), metal fibers (MF), or a mixture thereof, as a mixed braid,
   wherein the mantle layer further comprises a rigid reinforcing element, and
   wherein the mantle layer is the outermost layer.

2. The multi-layer mantle hose as claimed in claim 1, wherein the mantle layer consists of PPS.

3. The multi-layer mantle hose as claimed in claim 1, wherein the mantle layer as the mixed braid is in the form of staple fibers.

4. The multi-layer mantle hose as claimed in claim 1, wherein the mantle layer contains no glass fibers.

5. The multi-layer mantle hose as claimed in claim 1, wherein at least one intermediate layer and/or at least one embedded reinforcing element layer is arranged between the inner layer and the mantle layer.

6. The multi-layer mantle hose as claimed in claim 5, wherein the intermediate layer consists of FKM.

7. A turbocharger comprising the multi-layer mantle hose as claimed in claim 1.

8. A compressor comprising the multi-layer mantle hose as claimed in claim 1.

9. A diesel particulate filter system comprising the multi-layer mantle hose as claimed in claim 1.

* * * * *